March 29, 1960  H. J. STEWART  2,930,605
SPRING AND HOLDER ASSEMBLY
Filed July 31, 1958

INVENTOR.
Howard J. Stewart

BY Christy, Parmelee & Strickland

Attorneys.

United States Patent Office 2,930,605
Patented Mar. 29, 1960

2,930,605

SPRING AND HOLDER ASSEMBLY

Howard J. Stewart, Washington Township, Westmoreland County, Pa., assignor to Union Spring and Manufacturing Co., New Kensington, Pa., a corporation of Pennsylvania Application July 31, 1958, Serial No. 752,221

4 Claims. (Cl. 267—1)

The present invention relates to springs of the type to absorb large compressive load with a minimum of movement under load. Sometimes a single spring of the type is used, other times a plurality of spaced single springs may be used to jointly absorb a larger load.

Such single springs may be mounted upon a vertical surface such as a wall or upon a horizontal surface such as a floor. The spring is in the form of a circular plate-like member formed to present a concave face to the load and is suitably heat treated to resiliently resist deflection into a flattened disc. Due to the exceptionally high pressures necessary to flatten the spring, the means for securing the spring in place must not be subject to any load except the weight of the spring. The usual practice is to provide a countersunk hole in the center of a spring to receive a screw attaching the spring to any desired surface which reacts against the load of the spring.

The degree of concavity or "dish" of the spring is relatively small and the reaction on the supporting wall surface when the spring is under load causes a depression to be formed in the wall which in effect nullifies the effect of the "dish" in the spring and reduces its resilient load carrying power. In the present invention I have provided a modified form of spring and a novel form of mounting for the spring eliminating depressions in the spring supporting surface.

In the drawings forming a part of the disclosure:

Figure 2:
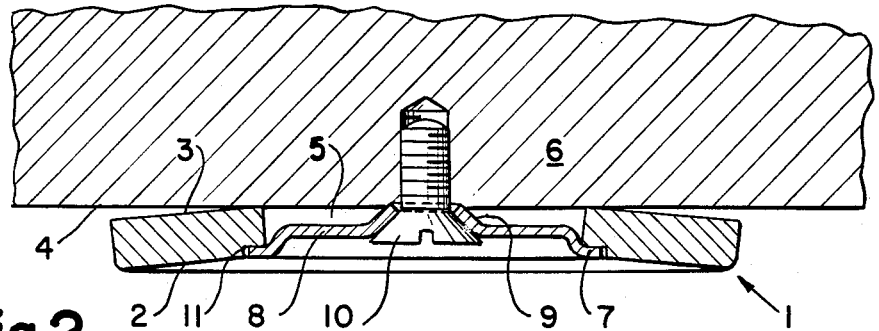
Fig. 2 shows a section through the opening and holder along lines II—II of Fig. 1.
Figure 1:
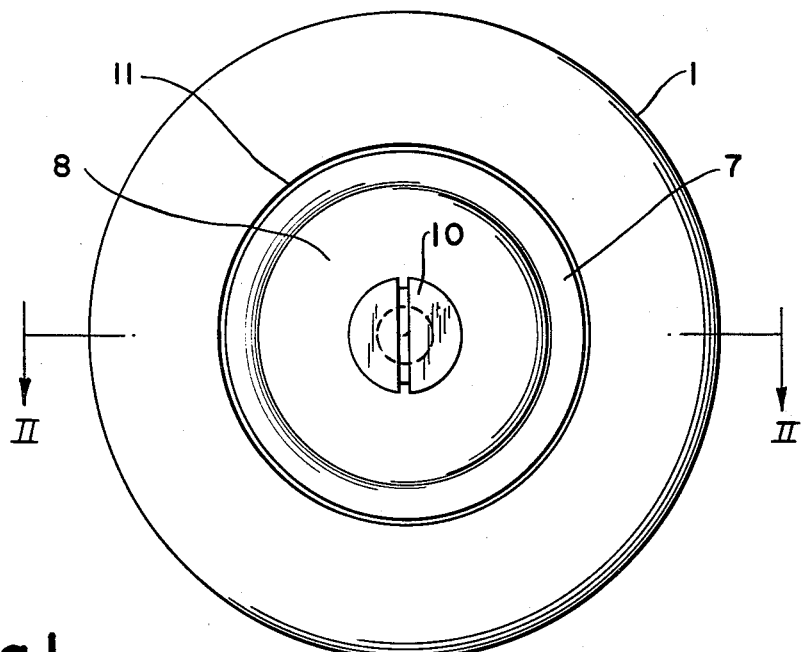
Fig. 1 shows a plan view of the spring, the holder and spring supporting surface.

Referring now in detail to the drawing, the spring 1 is circular having a concave or "dished" shape. The concave side 2 of spring 1 facing the load and the convex side 3 bearing against the supporting surface 4 which may be a wall or other suitable support to which the spring 1 is attached. The spring is formed from suitable alloy steel and is heat treated to resist deflection or "flattening" under load. A.I.S.I. 6150 steel has been found suitable for the purpose.

A central opening 5 in the spring 1 provides for reception of a suitable holder. This holder 6 may be a mild steel stamping. As shown the holder 6 comprises a circular plate having a peripheral face 7 and an inwardly off-set plate portion 8 connected therewith. Centrally of plate portion 8 is a countersunk opening 9 for reception of a screw or other fastening member securing the holder 6 to the surface 4. The peripheral face 7 of the holder overlaps the concave face 2 of the spring 1 and the spring is suitably recessed at 11 to receive the face 7 of the holder within the plane of the spring face 2.

The spring and holder assembly as described provides freedom for deflection of the spring without restriction from the holder and without imparting any of the spring load into the holder. The periphery of the inside diameter of the spring opening provides the area of initial contact and thus the area of reaction between the spring and the wall. The reaction stress at each increment of bearing contact between spring and wall may thus be reduced, thereby preventing depression of the wall at the area of spring contact and impedance to deflection of the spring under load.

A spring ⅜" thick having an I.D. of 2.5 inches and an O.D. of 5.0 inches having a "dish" of 0.090 inch made from suitably heat treated A.I.S.I. 6150 grade steel requires a compression force of 43,000 pounds to flatten the spring. The holder of mild steel need only support the weight of the spring and may be secured to the wall by a ⅜ inch flat head machine screw.

The holder as described permits use of springs of desired capacity with reaction at the bearing engagement between spring and wall support reduced to loads which do not impede free deflection of the spring under rated loads.

I claim:

1. In a coned disc spring and holder for mounting thereof upon a supporting surface, in combination, a ring shaped spring member of rectangular cross-section having a concave load receiving face and deflecting to a flattened disk under load, an annular recess in the concave outer face of the spring member at the central opening therein, a holder member disposed within said spring member central opening with its body portion in spaced relation to the inner periphery thereof and intermediate the planes of the inner and outer faces of the spring member, an outwardly extending flange on the holder member terminating in a laterally extending portion disposed within said annular recess in the outer face of the spring member, and a central opening in the holder member for receiving a fastening member securing the holder and spring in assembled relation upon a supporting surface.

2. The combination as defined in claim 1, wherein the ratio of the inside diameter of the spring to the outside diameter of the ring-like spring member is such as to prevent material compression of the supporting wall surface at the area of reaction to loading of the spring.

3. The combination as defined in claim 2 wherein the ratio of the inside diameter to the outside diameter is in the order of 1:2.

4. The combination as defined in claim 1 wherein the central opening in the holder member for reception of the fastener is countersunk to dispose the head of the fastener below the plane of the outer face of the spring member when flattened under load.

References Cited in the file of this patent

UNITED STATES PATENTS

| | | |
|---|---|---|
| 1,724,394 | Chamberlain | Aug. 13, 1929 |
| 1,939,286 | Spencer | Dec. 12, 1933 |